Patented May 23, 1939

2,159,195

UNITED STATES PATENT OFFICE 2,159,195

WATER-SOLUBLE DERIVATIVES OF VAT DYESTUFFS

Ludwig Zeh, Leverkusen-Wiesdorf, and Claus Heuck, Leverkusen-I. G.-Werk, Germany, assignors to Durand & Huguenin Aktiengesellschaft, Basel, Switzerland, a corporation of Switzerland No Drawing. Application November 14, 1933, Serial No. 698,014. In Germany November 18, 1932

7 Claims. (Cl. 260—321)

The present invention relates to new water-soluble derivatives of vat dyestuffs and to compositions of matter comprising the new water-soluble vat dyestuff derivatives, more particularly it relates to salts of acid sulfuric acid esters of the leuco compounds of vat dyestuffs with bases containing at least once a straight or a branched aliphatic hydrocarbon chain with at least one ethereal oxygen atom and at least one hydroxy group. These amines may be primary, secondary or tertiary ones, that means, they may be represented by the general formula: alk—NH₂, wherein alk stands for a straight or branched aliphatic hydrocarbon chain with at least one ethereal oxygen atom and at least one hydroxy group, and wherein the hydrogen atoms of the amino group may be wholly or partially replaced by alkyl containing at least one ethereal oxygen atom and at least one hydroxy group, or by alkyl, and/or hydroxyalkyl, and/or aralkyl, and/or cycloalkyl, or also by alkylene groups which are linked up to form a ring and which may be interrupted by hetero atoms, for example, by oxygen, sulfur or nitrogen.

The bases used in the manufacture of our new salts are obtainable, for example, by the action of an alkyleneoxide, such as ethyleneoxide or propyleneoxide, upon ammonia or a primary hydroxyalkyl-mono- or -poly-amine in which the hydrogen atoms of the amino group or groups may be substituted by alkyl, hydroxyalkyl, cycloalkyl, aralkyl or alkylene groups which are linked up to form a ring and which may be interrupted by hetero atoms, such as a sulfur, oxygen or nitrogen atom. Especially valuable for the purpose of the invention are those bases which are obtainable by the action of more than one molecular proportion of an alkyleneoxide, such as ethyleneoxide, upon one molecular proportion of a hydroxyalkyl amine in which the hydrogen atoms of the amino group may be wholly or partially substituted by alkyl and/or hydroxyalkyl, and/or aralkyl, and/or cycloalkyl, or may be substituted by alkylene groups which are linked up to form a ring and which may be interrupted by hetero atoms, such as sulfur, oxygen or nitrogen. For example, bases most valuable for the purpose of the invention are obtained when acting upon triethanolamine or a similar base with more than one molecular proportion, say with 2, 3, 4 or 5 or more molecular proportions of ethyleneoxide, thereby most probable mixtures of different bases containing aliphatic chains with at least one ethereal oxygen atom and at least one hydroxy group are obtainable, and it shall be mentioned that it is not necessary for the purpose of the invention to isolate the different bases from these mixtures, but that the mixtures as obtained can be used.

Suitable bases for preparing our new ester salts are, for example, the trihydroxyethylether of triethanolamine, bis-dihydroxypropylether of triethanolamine, dihydroxyethylether of propanediolamine, triethyleneglycolether of the dibutylhydroxyethylamine, dihydroxypropylether of the benzylethyl-hydroxyethylamine, dihydroxypropylether of the bis-propanediolcyclohexylamine, dihydroxypropylether of the propanediolcyclohexylethylamine, hydroxyethylether of the hydroxyethylpiperidine, the corresponding morpholine or thiomorpholine compounds or the dihydroxyethylether of the dihydroxyethylpiperazine.

Our new ester salts of sulfuric acid esters of the leuco compounds are obtainable by acting with a base containing at least once a straight or branched aliphatic hydrocarbon chain with at least one ethereal oxygen atom and at least one hydroxy group and which base may contain attached to the basic nitrogen atom alkyl, and/or hydroxyalkyl, and/or aralkyl, and/or cycloalkyl, or alkylene groups which are linked up to form a ring and which may be interrupted by hetero atoms, upon an acid sulfuric acid ester of a leuco compound of a vat dyestuff or upon a salt of such an acid sulfuric acid ester with a volatile base, such as ammonia or pyridine.

The new salts of the acid sulfuric acid esters of the leuco compounds of vat dyestuffs are generally stable, dark colored oils which are easily soluble in water. By adding to their aqueous solution an oxidizing agent, such as sodium nitrite, and a mineral acid, the sulfuric acid ester group is split off, thereby simultaneously an oxidation of the leuco compound to the vat dyestuff taking place, which vat dyestuff separates in an insoluble form.

Our new salts of acid sulfuric acid esters of the leuco compounds of vat dyestuffs are valuable products for dyeing and printing vegetable or animal fibres. They are distinguished by an excellent solubility in water and, compared with the hitherto used alkali metal salts of the sulfuric acid esters of the leuco compounds of vat dyestuffs or even of the salts with di- or triethanolamine or similar bases, they exert a highly increased solubility in water. Due to this solubility the new salts even of those vat dyestuffs which in view of the insufficient solubility of the hitherto known salts have not been suitable for printing, are excellently suitable for printing purposes.

In applying our invention to dyeing and printing processes, it is not necessary to use an isolated salt of the acid sulfuric acid ester of the leuco compounds of vat dyestuffs with the bases in question, but the salts can be formed in the dyeing or printing process itself by adding to the dyeing bath or printing paste the free sulfuric acid ester of the leuco compound of the vat dyestuff or a salt thereof with a volatile base, such as ammonia or pyridine, and the base containing at least once a straight or branched aliphatic hydrocarbon chain with at least one ethereal oxygen atom and at least one amino group; this process of carrying out our invention being equivalent to that in which the isolated salts are used.

The invention is illustrated by the following examples, without being limited thereto:

*Example 1.*—750 parts by weight of the pyridine salt of the acid sulfuric acid ester of the leuco-2.1-naphthothioindigo are dissolved, while hot, in 880 parts by weight of a base which has been prepared from 184 parts by weight of piperidine and 696 parts by weight of ethyleneoxide, in about 4000 parts by weight of water. The solution thus obtained is concentrated to 1360 parts by weight, advantageously in a vacuo. The base-salt of the acid sulfuric acid ester of the leuco-2.1-naphthothioindigo containing about 31% of the dyestuff is thus obtained in form of a thick, viscous, yellowish-brown colored mass, easily soluble in water.

*Example 2.*—785 parts by weight of the pyridine salt of the leuco sulfuric acid ester of the 2.7-dibromoanthanthrone are introduced with stirring into about 3500–5000 parts by weight of water, and 670 parts by weight of the hydroxy ether prepared from 456 parts by weight of triethanolamine and 540 parts by weight of ethyleneoxide are added. After heating for a short time, there is obtained a clear yellowish-brown, intensely fluorescent solution which is concentrated at 60–70° C. in a vacuo to a dyestuff content of 32%. Thus are obtained 1450 parts by weight of a strongly viscous brownish liquid, which is easily soluble in water.

For producing the new salt it is not necessary to start with the isolated pyridinium salt of the ester, but there can be used with the same result the crude product obtainable by performing the esterification in pyridine.

Instead of using the pyridine salt there can also be used other salts, such as the salt of dimethylaniline.

In an analogous manner the base-salts of the acid sulfuric acid esters of other vat dyestuffs can be prepared.

*Example 3.*—8 parts by weight of a solution containing 25% of the salt of the acid sulfuric acid ester of the leuco-2.1-naphthothioindigo with the trihydroxy-ether of triethanolamine are stirred into a paste prepared from 5 parts by weight of thiodiethyleneglycol, 26 parts by weight of water, 50 parts by weight of a neutral starch tragacanth thickener, 5 parts by weight of an aqueous ammonium thiocyanate solution (1:1), 4 parts by weight of an aqueous sodium chlorate solution (1:3) and 2 parts by weight of an aqueous ammonium vanadate solution of 1% strength. With this printing paste cotton is printed in the usual manner, after this, the same is steamed in a Mather Platt apparatus for 5 minutes, rinsed, soaped in a boiling bath and again rinsed. After drying, there are obtained blue shades which are more powerful and more clear than those obtained with the corresponding quantity of the sodium salt of the ester.

By substituting the ester salt referred to above by the corresponding quantity of a salt of the acid sulfuric acid ester of 2.1-naphthothioindigo with a hydroxy-ether base obtainable by the action of 317 parts by weight of ethyleneoxide upon 85 parts by weight of piperidine similar results are obtained.

The base salts referred to about can also be used with advantage in the dyeing of wool and cotton.

*Example 4.*—5 parts by weight of the pyridine salt (or the corresponding quantity of the ammonium salt) of the acid sulfuric acid ester of leuco -5.5'- dichloro-4.7-4'.7'-tetramethyl-thioindigo are stirred into a thickener prepared from 5 parts by weight of thiodiethyleneglycol, 26 parts by weight of water, 50 parts by weight of a neutral starch tragacanth thickener, 5 parts by weight of an aqueous ammonium thiocyanate solution (1:1), 4 parts by weight of an aqueous sodium chlorate solution (1:3), 2 parts by weight of an aqueous ammonium vanadate solution of 1% strength and 3 parts by weight of the sodium salt of benzyl-p-sulfanilic acid. To this paste 5 parts by weight of a base prepared by the action of 160 parts by weight of ethyleneoxide upon 152 parts by weight of triethanolamine are added, and with this printing paste cotton is printed in the usual manner. The printed cotton is steamed in a Mather Platt apparatus for about 5 minutes, rinsed, soaped in a boiling bath, again rinsed and dried. Thus are obtained reddish-violet shades which are more powerful than those prepared with the sodium salt of the ester.

*Example 5.*—10 parts by weight of a solution containing 28% of the salt of the acid sulfuric acid ester of leuco-dichloroanthanthrone with the hydroxy-ether amine described in Example 2, are made into a printing paste, as described in Example 3, and with this paste cotton is printed and the dyestuff is developed in the usual manner. A full yellowish-orange is thus obtained.

*Example 6.*—100 parts by weight of Caledon Jade Green (compare Colour Index 1924, page 265, No. 1101) are transformed into the dimethylaniline salt of the acid sulfuric acid ester of the leuco compound of this dyestuff according to the directions given in U. S. Patent 1,448,251, and the dimethylaniline salt is introduced into 2000 parts by weight of water containing 200–220 parts by weight of the hydroxy ether prepared by the action of 540 parts by weight of ethyleneoxide upon 456 parts by weight of triethanolamine. The dimethylaniline is distilled off in a vacuo, the solution is filtered and concentrated in a vacuo to a paste of a dyestuff content of about 20%. The dark brownish-red mass thus obtained can be used for printing, slop-padding and dyeing according to the methods known per se.

30 grams of the brownish-red paste obtained are dissolved in one litre of a soft water, 5 grams of sodium nitrite are added, and in this bath cotton is slop-padded and passed through a bath of 70° C. containing in a litre 35 cc. of sulfuric acid of 66° Bé. The cotton is rinsed, soaped, again rinsed and dried. A clear green is thus obtained.

We claim:

1. As new products the salts of acid sulfuric acid esters of the leuco compounds of vat dyestuffs with bases obtainable by the action of at least one molecular proportion of an alkylene oxide upon triethanolamine, being generally stable, dark colored oils which are easily soluble in water.

2. As new products the salts of acid sulfuric acid esters of the leuco compounds of vat dyestuffs with bases obtainable by the action of about 1 to about 5 molecular proportions of an alkylene-oxide upon triethanolamine, being generally stable, dark colored oils which are easily soluble in water.

3. As new products the salts of acid sulfuric acid esters of the leuco compounds of vat dyestuffs with bases obtainable by the action of at least one molecular proportion of ethyleneoxide upon triethanolamine, being generally stable, dark colored oils which are easily soluble in water.

4. As new products the salts of acid sulfuric acid esters of the leuco compounds of vat dyestuffs with bases obtainable by the action of about 1 to about 5 molecular proportions of ethyleneoxide upon triethanolamine, being generally stable, dark colored oils which are easily soluble in water.

5. As new products the salts of acid sulfuric acid esters of the leuco compounds of vat dyestuffs with a base obtainable by the action of 540 parts by weight of ethyleneoxide upon 456 parts by weight of triethanolamine, being dark colored oils which are easily soluble in water.

6. The products as defined in claim 1 wherein the vat dyestuffs are indigoid dyestuffs.

7. The products as defined in claim 1 wherein the vat dyestuffs are anthanthrone dyestuffs.

LUDWIG ZEH.
CLAUS HEUCK.